April 21, 1953        J. R. BIRD ET AL        2,636,084
ADJUSTABLE PROBE FOR HIGH-FREQUENCY ELECTRICAL DEVICES
Original Filed June 16, 1949        2 SHEETS—SHEET 2
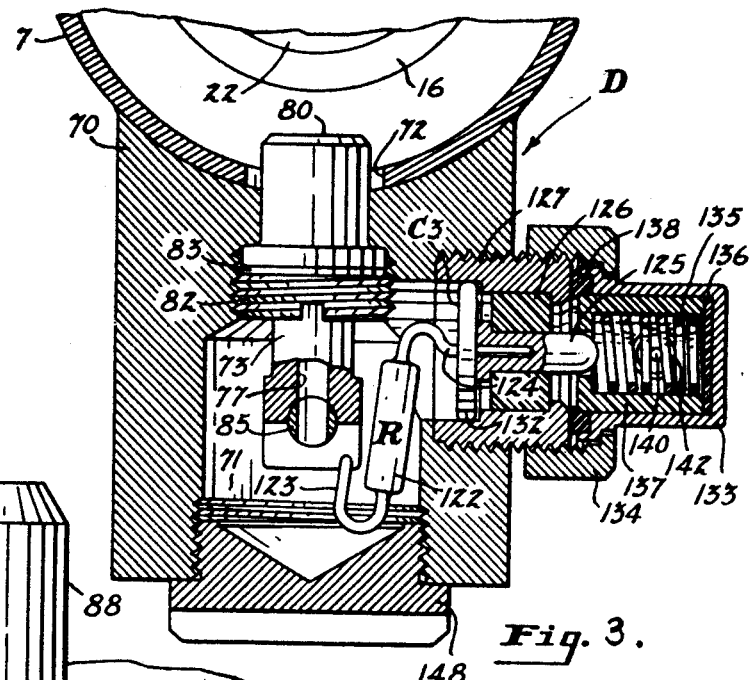
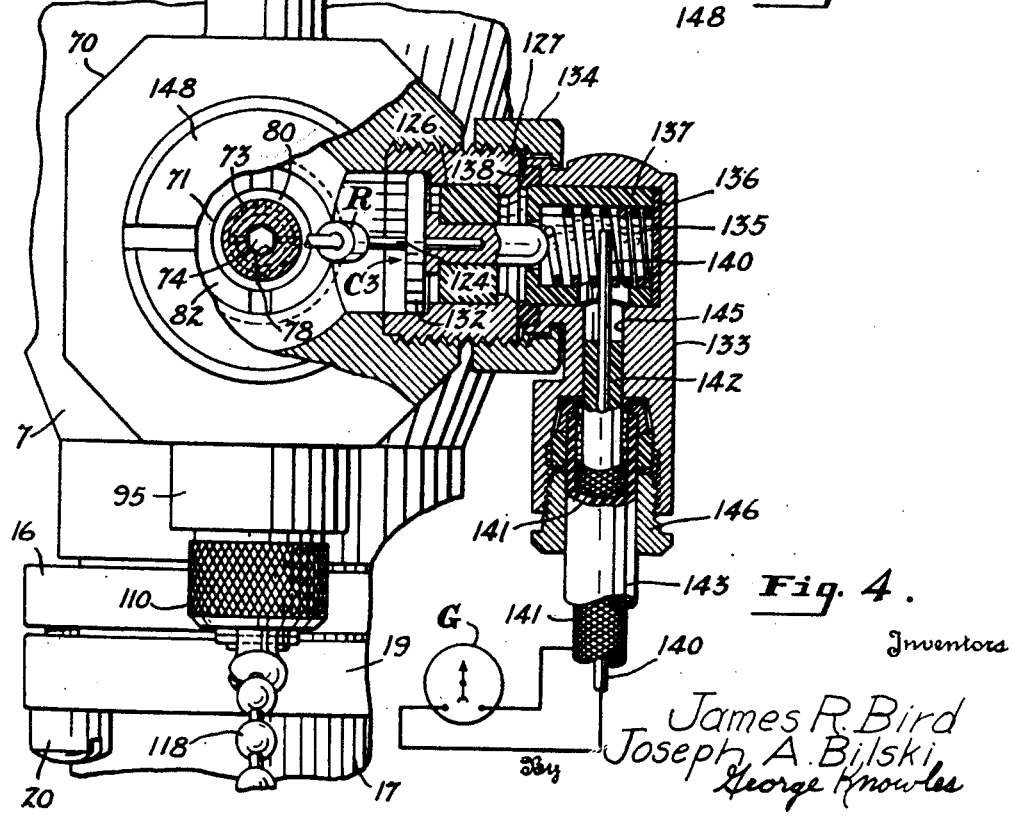
Inventors
James R. Bird
Joseph A. Bilski
George Knowles
Attorney Patented Apr. 21, 1953

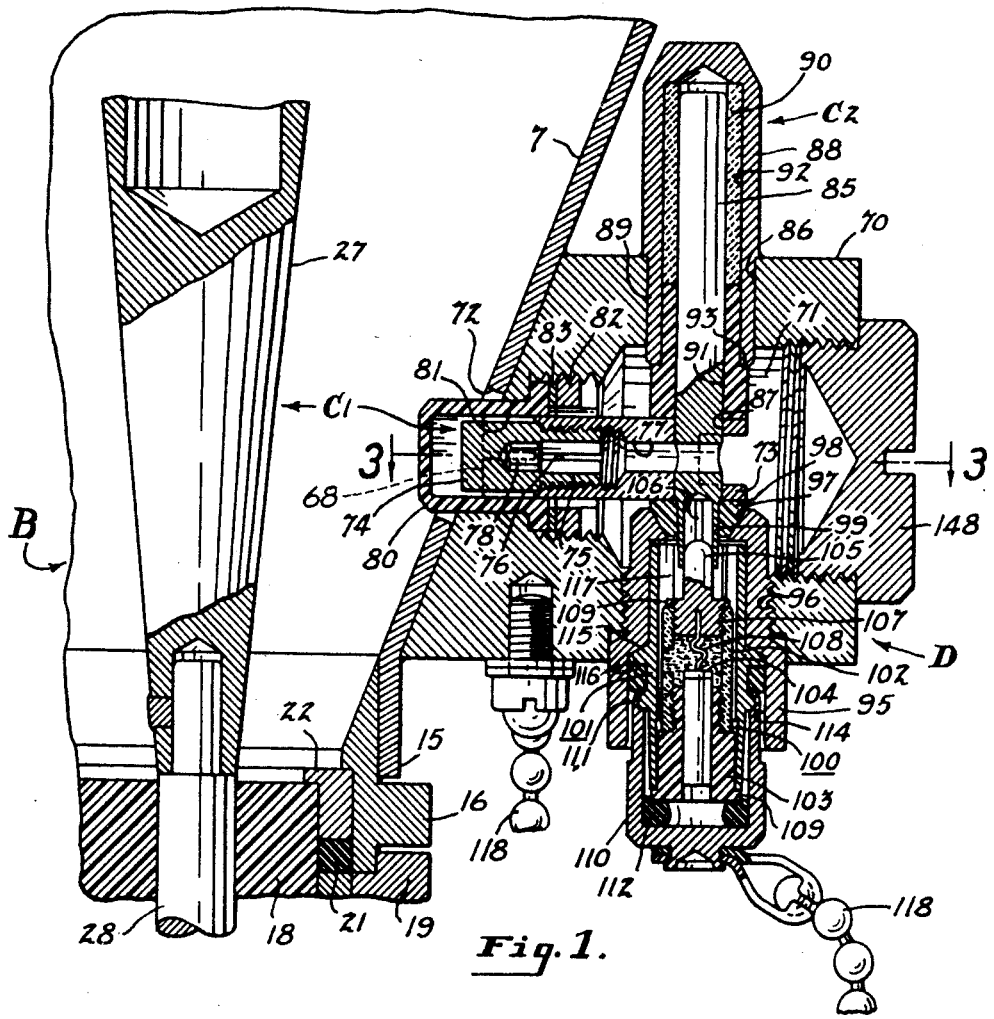

2,636,084

UNITED STATES PATENT OFFICE 2,636,084

ADJUSTABLE PROBE FOR HIGH-FREQUENCY ELECTRICAL DEVICES

James R. Bird, Chagrin Falls, and Joseph A. Bilski, Cleveland, Ohio, assignors to Bird Electronic Corporation, Cleveland, Ohio, a corporation of Ohio Original application June 16, 1949, Serial No. 99,474. Divided and this application November 26, 1952, Serial No. 322,767

6 Claims. (Cl. 178—44)

This invention relates to electrical measuring and detecting devices for use in high frequency electrical apparatus. Such a device or measuring instrument is disclosed in copending application for United States Patent Serial No. 99,474 filed June 16, 1949. The present invention is concerned with probes or coupling devices used in voltage dividers and the like for instruments of the character referred to and employed for detecting or sampling wave energy in tubular conductors.

Improvement of the physical structure and arrangement of parts in high frequency electrical detecting devices and in voltage and power measuring instruments is a principal objective of the present invention. It is sought to provide a generally improved probe and voltage divider assembly for use in such electrical detecting and measuring instruments, more specifically to provide an adjustable probe for a capacitance voltage divider or current sampler for high frequency use of the type in which the components are grouped in a compact assembly for attachment as a unit to a high frequency device.

Another object is to provide an adjustable probe as one component of an assembly, preferably a tree structure arranged within a chambered metal body which shields, supports, and protects the tree components.

Other objects and advantages pertaining to certain features of construction and combinations and arrangements of parts obtaining simplicity and economy are set forth in the following detailed description. This description is made in connection with the accompanying drawings forming a part of the specification.

In the drawings:

Figure 1 is a vertical sectional detail showing the adjustable probe of the present invention in a voltage divider or current pick-up assembly mounted on the transition or connector section of a coaxial line terminating unit;

Fig. 2 is a diagrammatic representation of a suitable electrical measuring device or wattmeter incorporating the probe assembly of the present invention;

Fig. 3 is an enlarged sectional detail with parts removed, taken substantially along the line indicated at 3—3 of Fig. 1; and Fig. 4 is an enlarged elevational detail partly diagrammatic, partly in section and with parts broken away and removed, showing the mounted voltage divider probe assembly connected to the current measuring device or galvanometer.

The present invention is concerned with the construction and arrangement of an adjustable probe unit of a voltage divider assembly mounted, say, on the tapered transition section of a coaxial line terminating unit designated at B. The complete instrument combination is more fully disclosed in the copending application referred to. Other combinations and uses of the present probe are, of course, contemplated. Power measurement is obtained and visually or otherwise indicated by means of a direct current or voltage measuring instrument such as a conventional galvanometer G.

The coaxial line unit B includes an outer tapered conductor or horn (not shown) attached at its large diameter end to a tapered or frustoconical connector 7. In making connections between permanently joined metal parts of the apparatus, soldering, brazing or welding is employed, using conventional techniques.

At its small diameter end the connector 7 is formed with a tubular cylindrical portion 15 which receives a turned brass fitting 16. A metal sleeve, a fragment of which is shown at 17, has a collar 19 welded or braced on one end. Screws 20 (Fig. 5) extend through the collar 19 and are threaded into the fitting 16. The joint is made fluid-tight as by a resilient O-ring 21 compressed between the end of the sleeve 17 and a flanged retainer ring 22. The circular flange on the retainer 22 engages one end of circular dielectric plug 18.

Extending longitudinally through the outer conductor of the line is an inner conductor assembly which includes a ceramic core (not shown) coated with a conductive carbon film. One end of the coated tube is received within a hollow cylindrical portion on the large diameter end of a tapered metal connector 27. The tapered connector 27 is formed or fitted at its small diameter end with a cylindrical rod 28 that is embraced and supported by the dielectric plug 18. The end of the rod 28 is split axially and bored out or otherwise formed for connection to the center conductor of a conventional coaxial electrical line. Threads on the tubular sleeve 17 receive the internally threaded collar of the coaxial line so that the outer conductor of such line makes electrical contact with the sleeve. Thus power to be absorbed or measured by the present device can be fed into the coaxial line unit B.

Difficulty has been encountered heretofore in obtaining accurate readings of voltages prevailing across coaxial lines and devices. Sampling of high frequency potentials across or at the entering ends of coaxial line devices has, however, been obtained by the use of capacitance voltage dividers and the present sampler D incorporates a number of improvements in such devices. It embodies a compact capacitance voltage divider one component of which is the adjustable probe of the present invention. A chambered or hollow body 70, formed of brass or similar conductive metal, is contoured on one side to conform to the outer surface of the connector 7 and is attached to the connector as by soldering or brazing. The body is formed with a central chamber 71 which communicates with the annular space between the center connector 27 and the tubular connector 7 through a lateral opening in the body and an aligned opening 72 formed in the connector.

Supported within the body 70 is a tree structure comprising a conductive metal stem 73 having a number of angularly disposed radial branches. The stem and branches are insulated from the body 70 and the stem is centered or axially disposed in the chamber 71 which chamber may be formed as by drilling to provide the different diameters desired. One end of the stem 73 is adjustable in length and comprises a metal probe 74 which is telescoped into the end of the stem body and projects into and through the opening 72 into the space between the inner and outer components of the coaxial line. This probe and the inner or center conductor of the coaxial line B comprise an adjustable or variable capacitor or condenser C-1. The probe is circular in section and has one end 75 threaded and screwed into internal threads formed in an axial bore within one end of the stem 73. The threaded end of the probe is resilient and expansible, being axially slotted as indicated at 76 (Fig. 1) and spread slightly prior to assembly as is the resilient and expansible slotted end of the stem 73 in which the probe is received. The threaded parts are thus frictionally restrained against relative turning and the probe 74 is retained in any desired position of axial adjustment. It is apparent that the relatively thin sectioned end portions 68 and 75 of the stem and of the probe respectively are of greater yieldability, being relatively resilient, and more readily conform to the parts with which they are telescoped than would be the case with corresponding parts of relatively thick section. Such turning adjustment is effected as by means of a hex ended rod passed axially into the stem 73 through a bore 77 and received in a mating hex socket 78 formed in the body of the probe 74. The body 70 is formed with an access opening into the chamber 71 aligned with the stem bore 77, the body opening being normally sealed by a threaded metal plug 148.

The ends of the probe and the stem are received and enclosed in a cylindrical flanged cup 80 formed of a relatively stiff insulating material such as polytetrafluoroethylene. This cup extends through passage 81 in the connector 7 and into the annular space between the coaxial line components. A threaded counterbore at the inner end of the body passage 81 receives a threaded washer 82 which compresses a washer 83 against the flanged end of the cup 80 to hold the cup in place and to provide a fluid-tight seal. The insulating cup 80 thus provides a sealed closure for the passage or opening into the chamber 71 of the probe and crystal assembly D, preventing liquid dielectric from entering the chamber from the line structure B.

Another branch of the tree structure is a cylindrical rod condenser element 85 disposed at a right angle to the stem 73 and which extends laterally through a radial opening 86 in the body 70. The rod 85 is secured in a transverse hole 87 drilled through the stem 73. Outer condenser element 88 is received over the rod 85 and constitutes therewith the capacitor C-2. The tube element 88 is formed with a reduced diameter end 89 press fitted into the radial passage 86 and soldered.

Ceramic sleeve 90 locates and supports the tree structure within the conductive metal body 70 and is formed of electrical porcelain or similar material. A reduced diameter portion on the end of yieldable polytetrafluoroethylene sleeve 91 is received within circular bore 92 of the capacitor cap 88 and annular shoulder 93 of the insulating sleeve seats against the end of the capacitor cap 88 to locate the parts in assembly.

Across the body chamber 71 from the capacitor C-2 is a rectifier assembly that includes a tubular retainer or sleeve 95 which has a threaded central portion received in a threaded radial passage 96 aligned with the capacitor passage 88. The crystal retainer 95 is formed with a tapered or frusto-conical seat 97 which is engaged by the matching face of a yieldable dielectric washer 98. The gasket or washer 98 is received about a tubular end portion 99 of the rod 85 which projects through the stem 73.

Within the retainer 95 a metal sleeve 101 holds a crystal rectifier unit 100. This unit includes a hollow ceramic tube 102 threaded internally. In one end of the tube a threaded base plug 103 holds an adjustable brass rod on which is mounted a current rectifying crystal 104.

The other end of the insulating tube 102 receives a threaded metal plug 107 having a rounded end 105 received slidingly in the tubular end 99 of the rod 85, the tube being slotted axially at 106 to grip the plug resiliently. A spring-like whisker wire 108 secured in the plug 107 makes point contact with the crystal 104. The cavity in the tube 102 is filled with wax.

The crystal unit 100 is held in place by a metal cap 110 having a thin edge 111 flanged over an annular rib on the sleeve 101. Rubber O-ring 112 is interposed between the inside end of the cap 110 and the crystal unit 100 and yieldingly holds flange 109 of the metal plug 103 seated against the end of the sleeve 101.

An integral circular rib 115 formed on the sleeve 101 seats against the end of counterbore 114 in the retainer sleeve 95 to locate the crystal holding sleeve in the assembly. A rubber O-ring 116 is received about the crystal holding sleeve 101 between the flanged edge 111 of the cap 110 and the locating rib 115. The inner end of the crystal holding sleeve 101 is axially slotted at 117 to provide a plurality of axial tines which frictionally engage the walls of the retaining sleeve 95 to hold the crystal unit within the sleeve. A link chain 118 is connected between the cap 110 and to the body 70.

A third branch of the tree structure comprises a resistor R, of the insulated metalized type, which is connected in series between the stem 73 and one terminal of the galvanometer G. The other terminal of the galvanometer is connected to the body 70 of the voltage divider or crystal cartridge assembly D. Wire 123 from one end of the resistor R is connected to the stem 73 and wire 124 from the other end is connected to a metal terminal plug 125 supported by body 126 of phenolic resin held in externally threaded tubular fitting 127 screwed into a radial opening in the body 70. The inner end of the passage through the fitting 127 is counterbored to receive a button capacitor C-3 which makes electrical connection with the walls of the counterbore in the metal tube 127 through a metal ring 132.

Over the outer end of the tubular fitting 127 is received a metal connector fitting 133 having a threaded metal collar 134 which engages the threads on the tubular fitting 127. A spring 135 disposed in the upper end of the fitting 123 is insulated from the walls of the fitting by a plastic disc 136 and a dielectric cup 137. A rubber O-ring 138 embraces the end of the plastic cup 137 and is interposed between the side face of the fitting 133 and the end face of the tubular fitting 127 to provide a dust and moisture proof seal.

The galvanometer G is connected by means of a flexible cable comprising a central wire or conductor 140 and a flexible metal sheath 141. The center conductor of the coaxial cable is surrounded by insulating tube 142 and a protective insulating sheath 143 surrounds the woven conductor 141. The center conductor 140 and the tubular insulation 142 are received in a bore 145 formed in the swivel end fitting 133. A threaded ferrule 146 surrounds the flexible cable and compresses an insulating plastic jam washer 149 and a rounded end metal jam washer 150 in the tapered portion of the counterbore. The chamber 71, which is formed with an opening through the end of the body 70, is closed as by a threaded metal plug 148.

The voltage drop or potential difference across the input end of the load B, between the center tapered connector 27 and the surrounding or outer tapered connector 7, is divided between the capacitors C-1 and C-2 inversely proportional to their capacitances. Capacitance C-1, comprising the inner connector 27 and the probe 74, is relatively small with respect to the coaxial capacitance C-2. Accordingly the voltage drop across C-2 is a small fraction or sample of the total voltage impressed upon the coaxial line B.

The action of the crystal and other circuit elements described herein is to produce in the galvanometer G a small direct current proportional to the high frequency voltage across the coaxial resistor device D. The galvanometer, by suitable calibration of its dial, thus indicates directly the high frequency power being absorbed.

In accordance with the patent statutes the principles of the present invention may be utilized in various ways, numerous modifications and alterations being contemplated, substitution of parts and changes in construction being resorted to as desired, it being understood that the particular apparatus and combination shown in the drawings and described above are given merely for purposes of explanation and illustration without intending to limit the scope of the claims to the specific details disclosed.

What we claim and desire to secure by Letters Patent of the United States is:

1. A probe structure for use in combination with a high frequency electrical transmission line having an opening, said structure comprising a stem member and means for mounting the stem member on the line in insulated relation, a probe member mounted on one end of the stem member, the members being received one within the other in the provision of a telescopical connection, said connection including interfitting threads formed on the members for relative axial adjustment of the probe member in varying the position of the latter relative to the line opening, said telescopical connection also including axially spaced portions located one at said one end of the stem member and another at one end of the probe member axially spaced along the stem member from said one end of the latter, one of the members at each of said axially spaced portions of the telescopical connection being resilient and radially yieldable and being sprung against the other member in the provision of frictional restraint against turning and yielding contact between the members at said one end of the stem member and at said one end of the probe member, and the resilient and radially yieldable member at one of the axially spaced portions being formed with threads to constitute an element of the interfitting threads of the connection.

2. A probe structure for use in combination with a high frequency electrical transmission line having an opening, said structure comprising a stem member and means for mounting the stem member on the line in insulated relation, a probe member having a telescopical connection with the stem member, the stem and probe members being formed with interfitting threads along part of the telescopical connection for axial adjustment of the probe member relative to the stem member upon relative turning of the members in varying the position of the probe member relative to the line opening, one of the members having at one part of the telescopical connection a resilient and radially yieldable end portion sprung against the other of the members, and at another part of the telescopical connection axially spaced along the probe member from said first mentioned part of the telescopical connection one of the members having a resilient and radially yieldable end portion sprung against the other of the members, one of the said resilient and radially yieldable end portions being formed with threads to constitute an element of the said threaded part of the telescopical connection.

3. A probe structure for use in combination with a high frequency electrical transmission line having an opening, said structure comprising a stem member and means for mounting the stem member on the line in insulated relation, a probe member in telescopical relation to the stem member, the said stem and probe members having portions formed with interfitting threads to effect axial adjustment of the probe member relative to the stem member upon relative turning of the members and having other portions formed with smooth cylindrically curved surfaces in sliding telescopical engagement with one another, the smooth surfaced portion of one of the members being resilient and radially yieldable, and the threaded portion of one of the members also being resilient and radially yieldable in the provision of frictional restraint against turning and yielding contact between the members at both the smooth surfaced portions and the threaded portions.

4. A probe structure for use in combination with a high frequency electrical transmission line having an opening, said structure comprising an elongated tubular stem member and means for mounting the stem member on the line in insulated relation, a probe member in telescopical relation to the stem member, said stem and probe members having portions formed with interfitting threads to effect axial adjustment of the probe member relative to the stem member upon relative turning of the members and having other portions formed with smooth cylindrically curved surfaces in sliding telescopical engagement with one another, the smooth surfaced portion of one of the members being resilient and radially yieldable, the threaded portion of one of the members also being resilient and radially yieldable in the provision of frictional restraint against turning and yielding contact between the members at both the smooth surfaced portions and the threaded portions, and the probe member being accessible through the tubular stem member for engagement by a turning tool in adjusting the position of the probe member.

5. A probe structure for use in combination with a high frequency electrical transmission line having an opening, said structure comprising an elongated tubular stem member and means for mounting the stem member on the line in insulated relation, a probe member mounted on one end of the stem member, the members being received one within the other in the provision of a telescopical connection, said connection including interfitting threads formed on the members for relative axial adjustment of the probe member upon relative turning of the members in varying the position of the probe member relative to the line opening, said telescopical connection also including axially spaced portions located one at said one end of the stem member and another at one end of the probe member axially spaced along the stem member from said one end of the latter, one of the members at each of said axially spaced portions of the telescopical connection being resilient and radially yieldable and being sprung against the other member in the provision of frictional restraint against turning and yielding contact between the members at said one end of the stem member and at said one end of the probe member, the resilient and radially yieldable member at one of the axially spaced portions being formed with threads to constitute an element of the interfitting threads of the connection and the probe member being accessible through the tubular stem member for engagement by a turning tool in adjusting the position of the probe member.

6. A probe structure for use in combination with a high frequency electrical transmission line having an opening, said structure comprising a stem member and means for mounting the stem member on the line in insulated relation, a probe member mounted on one end of the stem member, one of the members having an axial circular sectioned recess opening through one end thereof and including coaxial recess portions of different diameters continuous with one another, the other of the members being received within the recess of one member in the provision of a telescopical connection and having portions complemental to the said recess portions in the provision of mutually contacting relatively slidable surfaces on the members, one of the recess portions and the portion of the other member complemental thereto being formed with interfitting threads for relative axial adjustment of the probe member in varying the position of the latter relative to the line opening, and said telescopical connection also including axially spaced portions located at the said different diameter recess portions, in each of said axially spaced portions one of the members being resilient and radially yieldable and being sprung against the other of the members.

JAMES R. BIRD.
JOSEPH A. BILSKI.

References Cited in the file of this patent

UNITED STATES PATENTS

| Number | Name | Date |
|---|---|---|
| 2,427,752 | Strempel et al. | Sept. 23, 1947 |
| 2,432,097 | Hewitt | Dec. 9, 1947 |
| 2,575,799 | Doherty | Nov. 20, 1951 |
| 2,605,459 | Cook | July 29, 1952 |